United States Patent Office 3,307,029
Patented Feb. 28, 1967

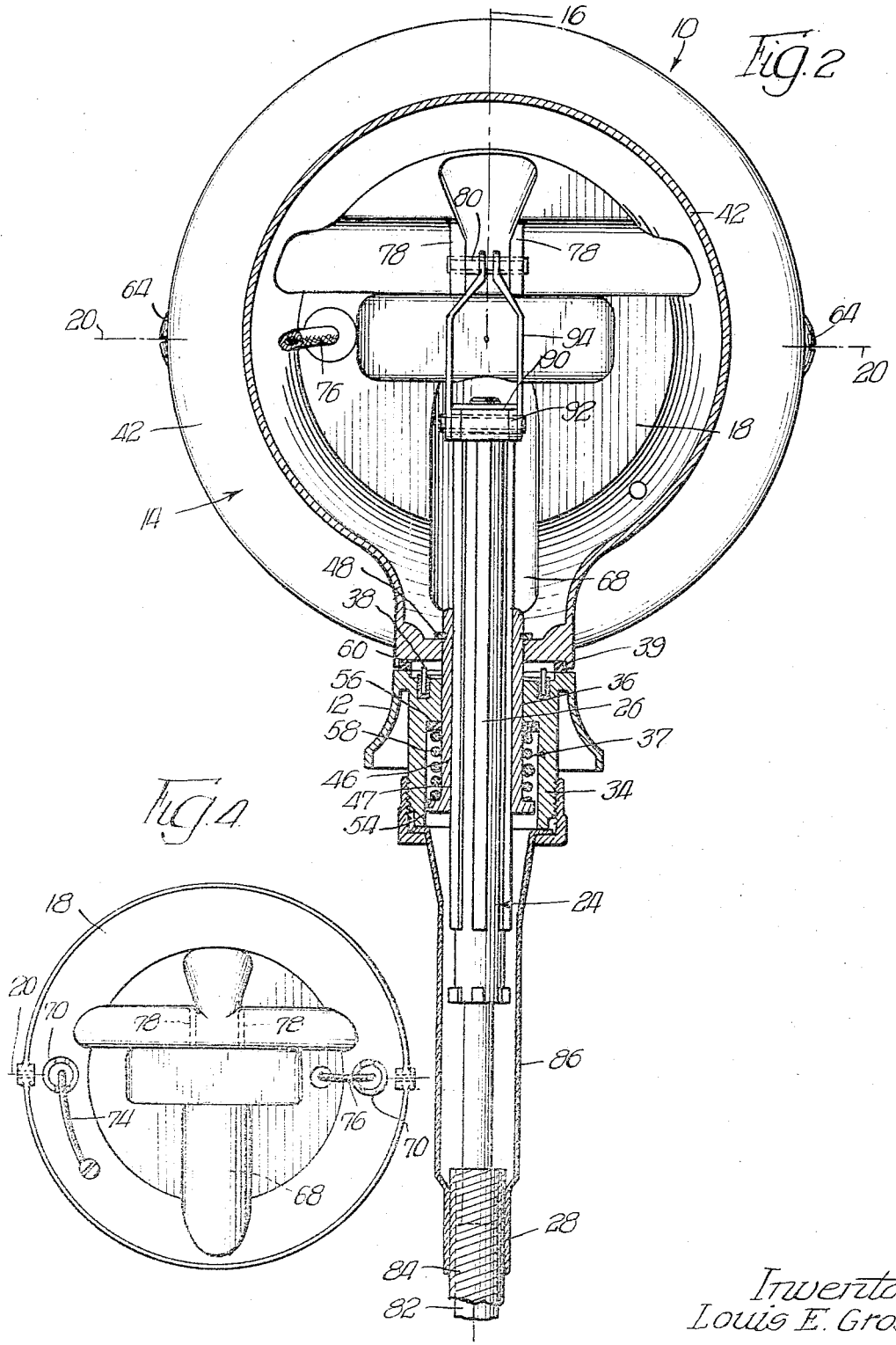

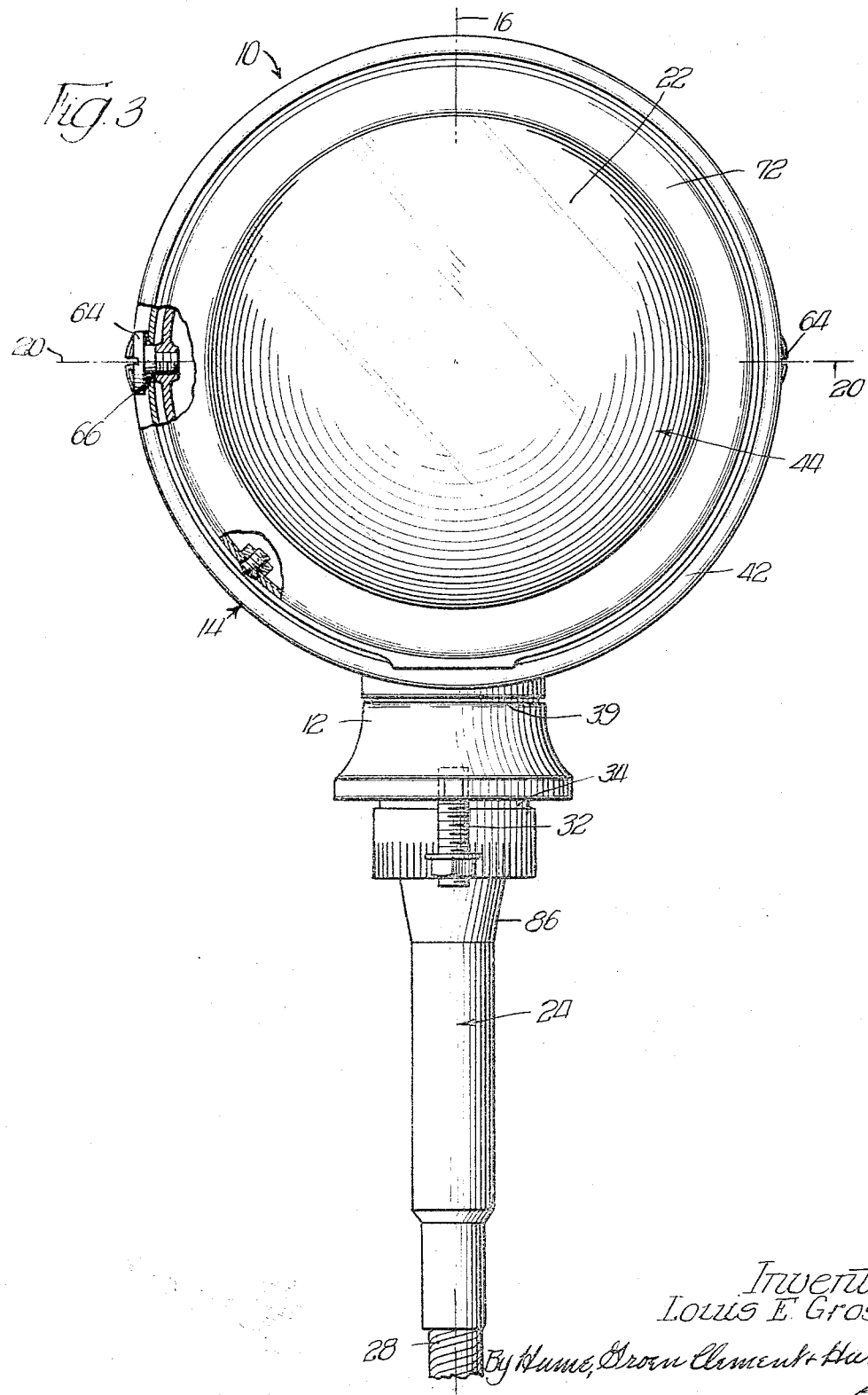

3,307,029
REMOTE CONTROLLED SPOTLIGHT
Louis E. Gross, Chicago, Ill., assignor to Unity Manufacturing Company, Chicago, Ill., a corporation of Illinois
Filed Sept. 30, 1964, Ser. No. 400,325
1 Claim. (Cl. 240—61.13)

The present invention relates to spotlights and more particularly to spotlights positionable by remote control.

It is a general object of the present invention to provide a new and improved remotely positionable spotlight.

It is an object of the invention to provide a spotlight having a novel positioning movement.

It is a further object of the invention to provide an economical spotlight which may be rapidly, smoothly, and accurately positioned or aimed remotely with little effort and is not affected in its operation by wind, vibration, or other forces.

It is a specific object of the invention to provide a remotely positionable spotlight adapted to be mounted at any desired location and accurately remotely controlled from a different location by a flexible cable control means.

It is a further specific object of the invention to provide a remotely controlled spotlight having a base assembly, an outer housing assembly rotatably mounted upon the base assembly, an inner bulb-containing housing pivotally mounted substantially within the outer housing assembly, and a remote control means associated with both the outer housing assembly and the inner housing adapted to selectively rotate each about a different axis.

Further objects and features of the invention pertain to the particular arrangement and structure whereby the above-identified objects and other objects of the invention are obtained.

The invention will be better understood with reference to the following specifications and drawings forming a part thereof, wherein:

FIGURE 2 is a rear elevation of the embodiment of FIGURE 1, in cross section along the line 2—2 of FIGURE 1;

FIGURE 3 is a front elevation of the embodiment of FIGURE 1, and;

FIGURE 4 is a front elevation of the inner housing member of the embodiment of FIGURE 1, with the spotlight bulb removed.

Figure 1:
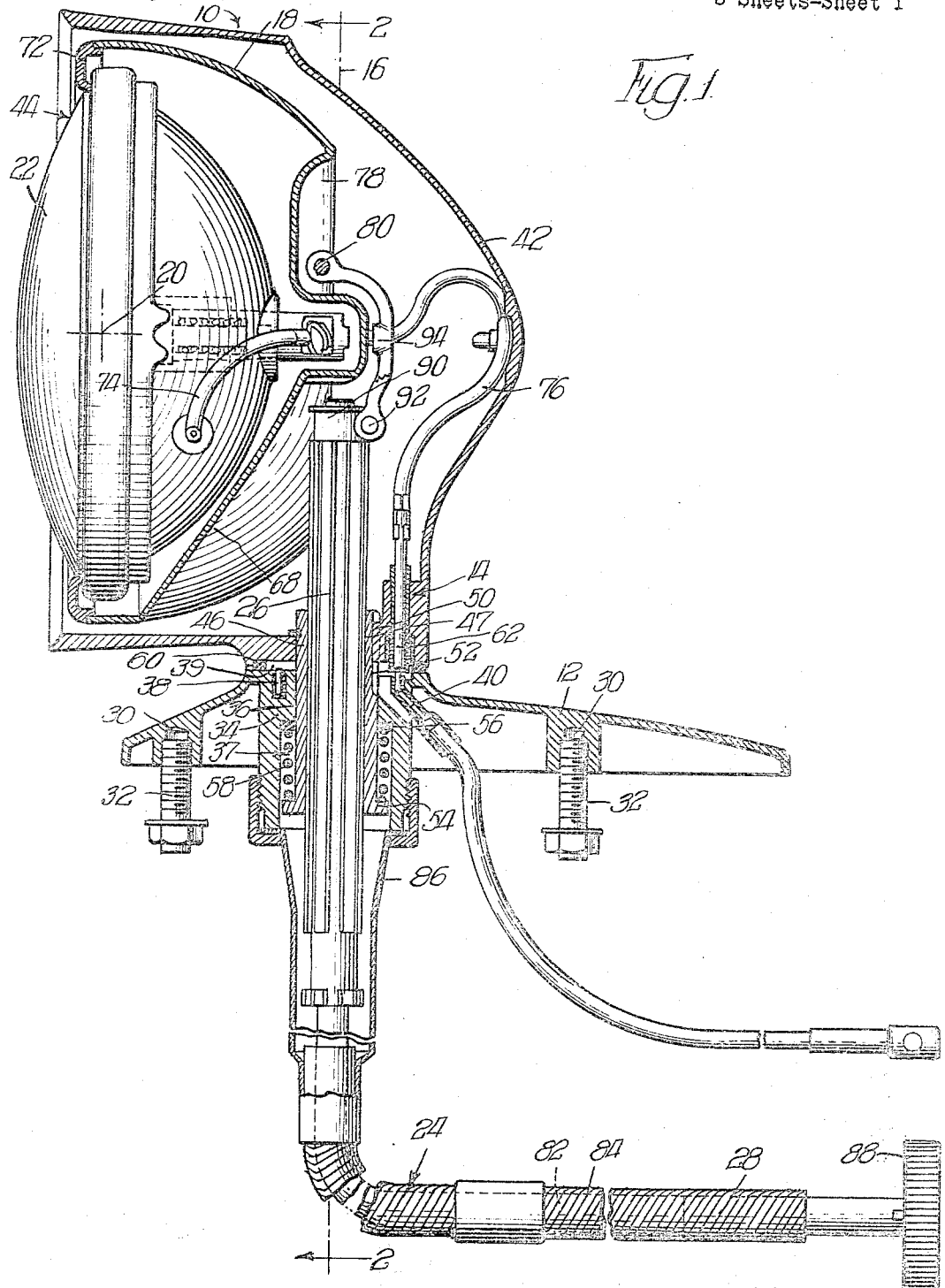
FIGURE 1 is a side view in central cross-section of an embodiment of the invention.

Turning now to the drawings and referring specifically to FIGURE 1, there is shown therein a remotely controlled spotlight 10 in accordance with the present invention. Specifically the spotlight 10 includes a fixed base assembly 12, an outer housing assembly 14 rotatably mounted on the fixed base assembly 12 for rotation about a first axis 16, an inner housing 18 pivotally mounted inside the outer housing assembly 14 for rotation about a second axis 20 and having a spotlight bulb 22 secured therein, and a splined rod 26 which by its reciprocal movement rotates the inner housing 18 and by its rotation rotates the outer housing assembly 14, the splined rod 26 being driven by a flexible cable driving means 28.

Examining in greater detail the structure of the spotlight 10, referring to all of the drawings, FIGURES 1–4, there will be described first the fixed base 12. The base 12 is intended to provide the mounting attachment and support for the spotlight 10 by being rigidly secured to the object (such as an automobile, truck, or boat) upon which it is desired to mount the spotlight 10. Any suitable shape or configuration of base may be employed. However, it is preferred that spaced holes 30 be provided in the base for fastening means such as the threaded bolts 32 shown projecting downwardly therefrom. The bolts 32 may be provided with nuts or other suitable fastening means in order to secure the lower surface of the base 12 against the object, preferably using a resilient gasket therebetween. The spotlight 10, and hence the base 12, is preferably substantially vertically mounted to provide for continuous horizontal rotation for the spotlight, as will be explained herein. Located in the base 12 is preferably a central downwardly projecting cylindrical extension 34, externally threaded and having centrally therethrough a vertical cylindrical bore 36, through which bore the remote control means 24 may be operated. The upper surface of the base 12 is preferably provided with a generally planar horizontal surface area 39 above the extension 34 adapted to abut the lower extremity of the outer housing assembly 14. An exemplary electrical connection is provided by a projecting annular ring 38 of conductive material, such as copper, in an electrical insulator, mounted in the surface area 39 of the base. The annular ring 38 provides a continuous conductor rail for transmission of electricity for the spotlight bulb by a sliding contact into the outer housing assembly 14. This annular ring 38 is preferably electrically connected to an insulated wire assembly 40 having a conventional electrical conductor wire and extending from the base 12 for connection to an electrical system. In a two wire, or non-chassis ground return system, there may be provided two of the annular rings 38, or other suitable electrical connections.

The outer housing assembly 14 is adapted to enclose, support, and protect the moving portions of the spotlight 10, particularly the spotlight bulb 22, and to provide a pleasing exterior appearance. To these ends the outer housing assembly 14 preferably comprises a relatively thin-walled but sturdy enclosing shell 42 of cast metal or other suitable material, which is sufficiently large to substantially enclose within its interior the inner housing 18 and the spotlight bulb 22. At the front of the outer housing 14 there is preferably a large opening 44. The opening 44 provides an aperture through which the spotlight beam may be thrown and consequently preferably corresponds to, or is somewhat larger than, the diameter of the spotlight bulb 22.

Examining the rotatable mounting of the outer housing assembly 14 upon the fixed base 12, the outer housing assembly 14 is mounted for continuous unrestricted rotation about the first axis 16. This is accomplished in the embodiment 10 by a hollow cylindrical sleeve or bushing 46 secured through the lower surface of the shell 42 and extending vertically downwardly therefrom. The upper end of the bushing 46 is rigidly secured to the shell 42 by a retaining ring 48 and by a lug 50 projecting from the shell 42, which lug 50 extends into and mates with a vertically slotted groove 52 in the exterior of the bushing 46. The exterior of the bushing 46 fits closely but rotatably within the vertical cylindrical bore 36 in the base assembly 12. The rotatable mounting of the cylindrical bushing 46 in the correspondingly cylindrical bore 36 provides a single fixed axis of rotation (the first axis 16) about the centerline of the bushing 46.

The lower portion of the cylindrical bore 36 is enlarged to provide an annular space 37 between the bushing 46 and the walls of the bore 36. At the shoulder formed at the upper end of this annular space 37 there is preferably inserted a flat anti-friction washer 56. A cylindrical coil spring 58 is then preferably mounted around the bushing 46 and retained in a compressed state in the annular space 37, between the washer 56 and an annular projection 54 at the lower end of the bushing 46. The coil spring 58 exerts a downward force upon the bushing 46 and thereby pulls the outer housing assembly 14 tightly against the base assembly 12. A friction ring 60 may be provided between the upper surface area 39 of the base and the corresponding lower surface of the outer housing assembly 14 to provide a low friction contact between the two surfaces.

A continuous electrical connection between the outer housing assembly and the base which allows a continuous rotation of the outer housing assembly 14 is provided, for example, by a spring-loaded electrical contactor 62 mounted in the shell 42 and spaced at the same radial distance from the first axis 16 as the annular conductor ring 38 in the base 12. The contactor 62 thereby maintains a continuous forceable sliding contact with the annular ring 38.

The outer housing assembly 14 provides means for pivotally mounted the inner housing 18 substantially within the shell 42. As particularly shown in FIGURE 3, this is preferably accomplished in the embodiment 10 by shoulder screws 64 or other suitable means forming a pair of pivot points on opposite sides of the shell 42 near the opening 44. The shoulder screws 64 are adapted to rotate upon their smooth shoulders within corresponding smooth holes through the shell 42 and to screw into threaded holes in opposite sides of the inner housing 18. A spring washer 66 may be provided between the heads of the screws 64 and the shell 42. The pivotal arrangement formed by the above or other suitable structures forms the second axis of rotation 20 about which the entire inner housing 18 rotates, the two pivot points preferably comprising the sole mechanical connection between the inner housing 18 and the outer housing assembly 14.

Preferably the second axis 20 extends substantially through the center of the inner housing 18 (as may be seen in FIGURE 1), supporting the inner housing 18 and the spotlight bulb therein substantially through their combined center of gravity. Further, the second axis 20 is preferably substantially perpendicular to he first axis 16. That is, the inner housing 18 is rotating about a horizontal axis and the outer housing assembly 14 is rotating about a vertical axis. As will be later described, for purposes of the remote control means 24 it is preferred that the first axis 16 and the second axis 20 be non-intersecting and spaced from one another.

Turning to the inner housing 18, this member may be of any suitable configuration adapted to rotate substantially within the outer housing assembly 14 and to support and secure the spotlight bulb 22 therein. It is preferred that the inner housing 18 be of lightweight construction, such as a thin wall metal or plastic casting, stamping, or other suitable construction, preferably substantially lighter in weight than the outer housing assembly 14. Since it is sheldered from external injury, wind forces and weather by being mounted inside the outer housing assembly 14, it need not have the strength, finish, or surface continuity of a conventional bulb-containing housing. The lower half of the rear of the inner housing 18 preferably has a large central recessed groove 68 to provide clearance for the splined rod 26 during rotation of the inner housing.

The spotlight bulb 22 for use in the spotlight 10 may be any of the conventional commercially available types. They differ in their mounting and electrical lead configurations, which need not be described herein. Merely by way of example, the particular inner housing 18 shown in FIGURE 4 is provided with a pair of raised slotted projections 70, each projecting into the interior of the inner housing 18 on one side thereof. Each of the projections 70 is adapted to receive a spotlight bulb plate and a bulb spring as shown in FIGURE 1 and to provide a fastening position for the connections to the electrical terminals upon the bulb. The particular spotlight bulb 22 shown herein may be fixedly secured within the inner housing 18 by a continuous annular ring 72 bearing against the front outer rim of the spotlight bulb 22, pressing the bulb back against the bulb springs. The ring 72 may be secured to the outer periphery of the inner housing 18 by screws or other suitable means.

Where a chassis return electrical system is employed, one of the spotlight terminals may be grounded directly to the inner housing 18 by means of a ground wire 74 as shown. The other or "hot" electrical path may be provided from the other bulb terminal to the electrical contractor 62 by means of an insulated electrical wire 76 passing through a hole in the rear of the inner housing 18.

The rear of the inner housing 18 may be provided with a spaced pair of ridges 78. Through these ridges 78 there may be secured a smooth rollpin 80 or other suitable axle means for a pivotal connection to the remote control means 24, as will be described herein.

Turning now to the construction of the remote control means 24 in the embodiment 10, there is included a rigid splined drive rod 26 extending up through the fixed base 12 and extending into the outer housing assembly 14. Movement of the splined rod 26 is directly controlled by means of the flexible cable driving means 28, which latter includes a rotatable and axially movable flexible inner core 82, axially slidable within a fixed but flexible outer casing 84. The outer casing 84 may be secured to the base 12 by means of an outer casing extension 86 screwed to the end of the base 12 extension 34. The inner core 82 preferably has one extremity firmly secured to the lower extremity of the splined rod 26. The opposite extremity of the inner core 82 is then preferably secured to a conventional operating handle 88. Rotation of the handle 88 causes equal rotation of the splined rod 26, and an axial or longitudinal movement of the handle 88 causes an equal axial or longitudinal movement of the splined rod 26. The operating handle 88 may be mounted at any convenient location with respect to the spotlight, due to the flexible nature of the cable and the fact that it may be made in any convenient length.

The inner core 82 in general must be capable of transmitting rotational force in either direction, as well as transmitting both compression and tension. A smooth wire which will not unwind and which is capable of transmitting force without any substantial build-up of tension or strain within the wire is preferred. (I.e., the inner core 82 should have a very limited amount of elasticity.)

Examining in further detail that part of the remote control means 24 directly associated with the moveable components of the spotlight 10, it will be noted from the discussion above that the splined rod 26 is adapted to have a longitudinal and a rotational movement. These movements are employed to rotatably position the spotlight bulb 22, as will be described herein. First it will be noted that the splined rod 26 is mounted slidably but close-fittingly through the central bore 47 of the bushing 46. The central bore 47 preferably has a mating corresponding inversely splined surface configuration so that the splined rod 26 makes a continuous slidable contact on its exterior surface with the interior surface of the bushing 46. Due to the splines on the rod 26 mating with correspondingly splined recesses in the bore 47, the splined rod 26 cannot rotate relative to the bushing 46. I.e., for purposes of rotation they are rigidly secured to one another. Since the entire outer housing assembly 14 including the bushing 46 fixed thereto is adapted to rotate about the first axis 16, and since the splined rod 26 extends longitudinally along the same axis 16, centered thereon, therefore rotation of the splined rod 26 causes a corresponding rotation of the outer housing assembly 14 about the first axis 16.

Due to the axially slidable mounting of the splined rod 26 through the bushing 46, the splined rod is free to move reciprocally longitudinal the first axis 16 through the bushing without changing the position of the outer housing assembly. This movement may occur simultaneously with the rotational movement described above.

The reciprocal movement of the splined rod 26 is employed in the embodiment 10 to provide the pivotal movement of the inner housing 18 about its axis of rotation 20, by pivotally connecting the upper end of the splined rod 26 to the rear of the inner housing 18.

An exemplary pivotal operating connection between the splined rod 26 and the inner housing 18 is as follows. At the upper end of the splined rod 26, a fastening device 90 such as a metal cap securing a rollpin 92 may be provided. Operably connecting this roll pin 92 with the rollpin 80 (at the rear of the inner housing 18) there is preferably provided a rigid linkage or yoke 94 with its opposite extremities pivotally secured to the respective rollpins 80 and 92. When the splined rod 26 is moved reciprocally upward or downward, the yoke 94 transmits this motion to the rear of the inner housing 18 at the rollpin 80. Since the second axis 20 about which the inner housing rotates is spaced from the first axis 16, the reciprocal movement transmitted by the yoke 94 is converted to a corresponding rotational movement of the inner housing 18. Thus the spotlight beam is pointed or aimed upwardly or downwardly depending on the axial position of the splined rod 26 along the first axis 16. The large recess 68 provided in the lower rear of the inner housing 18 provides sufficient clearance to prevent the splined rod 26 from interfering with the upward rotation of the inner housing 18.

It will be noted that having the first axis 16 spaced substantially to the rear of the second axis 20 is preferred in that it allows for vertical movement of the splined rod 26 behind the inner housing 18. This provides a more compact spotlight 10.

Considering next the operation of the spotlight 10, it should first be noted that there are certain operating requirements which a spotlight for general application should satisfy. First, the spotlight should be capable of a continuous and reversible 360° horizontal rotation, (rotation about a vertical axis), so as to aim upon and continuously follow any object, regardless of its relative movement with respect to the light. The requirements for vertical rotation (rotation about a horizontal axis) differ in that for most applications an extremely large angle of travel or continuous rotation is not essential. However, both vertical and horizontal movement should be smooth and accurate. Irregular or "jerky" movement makes it difficult to follow an object. A further generally demanded operating requirement is that both the horizontal and vertical positioning be accomplished through a single control handle, which handle may be operated with one hand by the operator. The spotlight should allow simultaneous horizontal and vertical movement by this single operating handle.

It will be observed that the spotlight of the present invention provides all of the above-mentioned operating advantages, as well as numerous other advantages, including those provided by the flexible cable remote control arrangement. In addition, the spotlight of the invention overcomes a number of disadvantages of prior art spotlights.

The more serious disadvantages of spotlights of the prior art included gravitational unbalance and a construction such that significant unbalanced wind forces were produced upon the spotlight. The above deficiencies often resulted in significant vibration of the spotlight and its light beam, and substantial rotation of the spotlight from its pre-set position. For example, in the case of prior art spotlights on police or other emergency vehicles, the above unbalanced wind and gravitational forces tended to vibrate and to tilt or rotate the entire spotlight back and downward during movement of the vehicle, so as to make the light more difficult to use. In an attempt to overcome these disadvantages, the use of frictional resistances to resist the unbalanced rotational forces upon the spotlight has been attempted. However, these resistance forces introduced a correspondingly increased resistance to the positioning of the spotlight by the operator and also tended to increase the "jerkiness" of the spotlight movement.

In the spotlight of the present invention, the pivotal mounting is such that the two respective axes of rotation 16 and 20 pass substantially close to the respective central portions of the respective rotational bodies (the outer housing assembly 14 and the inner housing 18). Thus, the gravitational forces acting upon these rotational bodies are relatively balanced about their axes. The remote control means 24 does not have to compensate for large unbalanced gravitational forces in its operation of the spotlight 10, and the spotlight does not have a tendency to be moved by such unbalanced forces from its initially aimed position.

Since the respective axes of rotation of the spotlight 10 pass substantially near the central portions of the rotating bodies, the exposed exterior surface areas of these bodies (primarily the shell 42 and the front of the spotlight bulb 22) are substantially evenly distributed with respect to the axes of rotation. Consequently, forces due to the wind resistance of the spotlight are substantially balanced with respect to the axes of rotation and have little if any tendency to cause rotation or vibration of the spotlight 10 in any direction. Due to the above gravitational and wind force balances the remote control means 24 is preferably constructed with minimum frictional resistance to positioning.

As previously discussed, the interior housing 18 is preferably of a very lightweight construction. This is in contrast to conventional spotlights having a heavy exterior-type bulb-containing housing, which heavy housing must be moved along with the bulb in all positioning movements of the spotlight. In the spotlight of the invention only the mass of the bulb and the lightweight inner housing are moved when vertically positioning the spotlight. This allows a smoother and more rapid movement.

Operation of the spotlight 10 is extremely simple. Horizontal movement of the spotlight beam is accomplished simply by rotating the operating handle 88 in the desired direction. This rotates the outer housing assembly 14 about the first axis 16. Since the inner housing 18 cannot move with respect to the outer housing assembly 14 in this first axis 16, the inner housing (and the spotlight bulb secured therein) rotate in direct accompaniment to any desired rotational angle given to the operating handle 88. Vertical positioning of the spotlight beam is accomplished by pulling or pushing the handle 88 to raise or lower the beam respectively. For example, pushing the handle 88 pushes the inner core 82 of the flexible cable inwards with respect to the outer casing 84 and thereby directly pushes the splined rod 26 upwards into the housing assembly 14. Through the coupling of the yoke 94, the inner housing 18 is thereby rotated about the second axis 20 and the spotlight beam moved angularly downward. Once positioned, the spotlight 10 will remain aimed in the same position until the handle 88 is again actuated by the operator.

By the terms "remotely controlled" or "remote control means" as used herein, it is meant that the spotlight bulb is angularly positionable or controlled by some means external to the immediate bulb housing. It does not necessarily mean a flexible cable or other extended arrangement unless so specified. While the device 10 is specifically designed for, and preferably operated by, a flexible cable remote control means as described above, it is to be appreciated that it would also be possible in certain mounting positions to use spotlights in accordance with the invention with other types of remote control means, such as for example a rigid extension from the splined rod 26.

It is clear from the foregoing disclosures that there has been provided hereby a novel remote controlled spotlight having an improved structure and operation. While the means described are preferred, it is contemplated that numerous variations and modifications within the purview of those skilled in the arts can be made herein. By way of example, it is clear that the function of the splined rod 26, while described herein as splined and mating with a correspondingly splined bushing 46, could be provided by any suitable member making a reciprocally slidable but non-rotatable fit with respect to the outer housing assembly 14. (I.e., any suitable non-circular shaft which fits closely but slidably through a correspondingly non-circular opening in the outer housing assembly.)

Numerous other changes may be made in the configuration, shape, and dimensions of the various components of spotlights constructed in accordance with the invention. It is intended to cover in the appended claim all such variations and modifications as fall within the true spirit and scope of the invention.

I claim:

A remotely controlled spotlight comprising: a base; an outer housing mounted upon said base and rotatably secured thereto for rotation only about a generally vertical first axis of rotation, said outer housing having a large light opening; a lightweight inner housing pivotally mounted to said outer housing for rotation within said outer housing only about a generally horizontal second axis of rotation substantially through the center of gravity of said inner housing; said inner housing having a spotlight bulb secured thereto for movement therewith and projection of light through said large light opening; electrical connecting means electrically connecting said spotlight bulb to said base and allowing unrestricted movement of said spotlight bulb with respect to said base; and remote control means for remotely positioning said spotlight bulb, said remote control means including drive means extending into said outer housing along said first axis and rotatably secured to said outer housing for mutual rotation about said first axis, said drive means being reciprocally axially movable with respect to said outer housing and pivotally secured to said inner housing for rotation of said inner housing about said second axis, and an elongate flexible driving cable with first and second extremities, said first extremity of said cable being secured to said drive means and said second extremity having an operating handle secured thereto, said cable being adapted for reversible rotation and axial movement by said operating handle, whereby rotation of said operating handle correspondingly rotates said drive means and axial movement of said operating handle axially moves said drive means.

References Cited by the Examiner

UNITED STATES PATENTS

| | | | |
|---|---|---|---|
| 1,499,640 | 7/1924 | Copeland | 240—61.13 X |
| 1,635,517 | 7/1927 | Tyler | 240—61.13 X |
| 2,212,048 | 8/1940 | Russell | 240—61.13 |
| 2,817,005 | 12/1957 | Cameron | 240—61.4 X |
| 3,057,262 | 10/1962 | Jacobson | 240—61.6 X |
| 3,075,073 | 1/1963 | Hildebrecht | 240—61.13 |

NORTON ANSHER, *Primary Examiner.*

C. R. RHODES, *Assistant Examiner.*